United States Patent [19]

O'Brien et al.

[11] Patent Number: 5,782,603
[45] Date of Patent: Jul. 21, 1998

[54] PROCESS AND APPARATUS FOR RECOVERY FROM ROTATING STALL IN AXIAL FLOW FANS AND COMPRESSORS

[75] Inventors: Walter F. O'Brien; Anthony L. DiPietro, Jr., both of Blacksburg, Va.

[73] Assignee: Virginia Tech Intellectual Properties, Inc., Blacksburg, Va.

[21] Appl. No.: 779,151

[22] Filed: Jan. 3, 1997

[51] Int. Cl.⁶ .................................................. F01D 17/08
[52] U.S. Cl. .............................. 415/1; 415/11; 415/17; 415/26; 415/116; 415/118; 415/119; 60/39.29
[58] Field of Search ............................ 415/1, 17, 11, 415/26, 27, 28, 29, 47, 49, 116, 118, 119; 60/39.29

[56] References Cited

U.S. PATENT DOCUMENTS

| | | |
|---|---|---|
| 4,251,985 | 2/1981 | Sullivan . |
| 4,622,808 | 11/1986 | Kenison et al. ............... 60/39.29 |
| 5,082,421 | 1/1992 | Acton et al. . |
| 5,141,391 | 8/1992 | Acton et al. . |
| 5,205,116 | 4/1993 | Ng . |
| 5,226,287 | 7/1993 | Ng . |
| 5,312,226 | 5/1994 | Miura et al. . |
| 5,340,271 | 8/1994 | Freeman et al. ............... 415/1 |
| 5,375,412 | 12/1994 | Khalid et al. . |
| 5,586,857 | 12/1996 | Ishii et al. ............... 415/17 |

*Primary Examiner*—Christopher Verdier
*Attorney, Agent, or Firm*—Whitham, Curtis & Whitham

[57] ABSTRACT

Active recovery from a rotating stall operating condition in an axial flow compression system is accomplished by altering the temperature and/or density of the working fluid flowing in the inlet of the compression system once rotating stall is detected. A burner is used to increase the compressor inlet flow temperature and concomitantly reduce the inlet flow density. Alternatively, a low density gas such as helium is injected into the compressor inlet. The ingestion of high temperature gases or other low density gases into the compressor energizes a dynamic response from the compression system that induces rotating stall recovery.

15 Claims, 5 Drawing Sheets

PROCESS AND APPARATUS FOR RECOVERY FROM ROTATING STALL IN AXIAL FLOW FANS AND COMPRESSORS

BACKGROUND OF THE INVENTION

1. Field of the Invention

The invention is related to a process and apparatus for the active recovery from rotating stall in axial flow fans and compressors and has particular application for recovery from rotating stall in jet engine fans and compressors.

2. Background Description

Axial flow fans and compressors are vulnerable to the phenomenon of rotating stall. Rotating stall is an operating condition where a localized circumferential portion of the compressor rotor operates stalled and the overall performance is reduced. It is a globally stable but locally dynamic operational mode that makes the compressor operate at a lower efficiency and pressure rise for a given rotor speed.

The manifestations of a rotating stall condition can be sensed and indicated by the engine control system or be observed. Some manifestations of rotating stall are a rapid increase in engine exhaust gas temperature, engine pressure ratio decrease or fluctuation, vibration caused by fan or compressor pressure pulsation, fluctuation in rotor revolutions per minute (RPM), and poor engine response to throttle movements. Severe compressor stalls can cause very loud noises, may be accompanied by fire, smoke, and vapors in the engine exhaust and/or engine inlet, and lead to excessive fan or compressor rotor blade vibration which can induce structural failure.

Inlet flow distortion is a common cause of rotating stall in aircraft gas turbine engine fans and compressors. These flow distortions are either pressure or temperature distortions or both. Pressure distortion can be caused by evasive or excessive aircraft flight maneuvers. It can also be caused by cross winds. Temperature flow distortions can be caused by the ingestion of exhaust gases from armament firings such as guns, rockets, and missiles. Also, re-ingestion of gas turbine engine exhaust gases in fixed wing and rotary wing vertical take off and landing/stationary take off and landing (VTOL/STOL) aircraft operation in close proximity to the ground are other common sources. These temperature distortions vary the chemical composition and reduce the density of the gas being compressed by the fan or compressor, causing the fan and compressor to stall.

The stall/flameout phenomenon is caused by a severe transient mismatch of the fan or compressor stages. Since the overall compressor characteristics are actually a composite of each individual stage, it is necessary for only one stage to be driven to a flow breakdown situation by a pressure or temperature distortion. When a flow breakdown and reversal does occur at one stage, or more likely a group of stages, the probable result is rotating stall or surge in the compressor and subsequent flame-out of the engine.

Rotating stall that occurs in the axial flow fan or compressor of an aircraft gas turbine engine causes a complete malfunctioning of the propulsion system. The consequences of a complete propulsion system malfunction for an aircraft in flight can be catastrophic. It is therefore desirable to implement rotating stall recovery techniques immediately after a rotating stall detection is made within the fan or compressor. Therefore, methods or techniques for prevention of and recovery from rotating stall are of considerable interest.

Current rotating stall recovery techniques involve the opening of the engine exhaust nozzle or bleed valves on the compressor to relieve air from the compressor. Compressor air bleed may allow the compressor to recover from the rotating stall operating condition, but the penalty for doing so is a loss of engine thrust. This is due to the fact that the effective compressor pressure ratio is reduced while the bleed valves are open.

Another compressor rotating stall recovery technique involves a reduction in fuel supply to the combustion chamber after rotating stall is detected to relieve the compressor back pressure. Other compressor rotating stall recovery techniques involve the use of variable inlet guide vanes and stator vanes within the axial flow fan or compressor. Vane angular position and the resultant air deflection are controlled automatically through the main fuel or engine control system after a rotating stall is detected. The most drastic rotating stall recovery technique is a complete engine shut down and restart.

SUMMARY OF THE INVENTION

It is an object of this invention to provide a method and apparatus for recovering an axial flow fan or compressor from rotating stall.

It is another object of this invention to provide a new method and system which allows recovery from rotating stall without engine shut down, fuel flow reduction, use of compressor bleed valves, or use of variable inlet guide vanes and stator vanes.

It is yet another object of this invention to provide axial flow fans and compressors with a method and apparatus which is selectively activated to inject either high temperature or low density gases into an inlet of the axial flow fan or compressor immediately after a rotating stall condition is detected.

According to the invention, recovery from rotating stall in an axial flow fan or compressor is accomplished by altering the temperature or density of the working gas entering the axial flow fan or compressor after rotating stall arises.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

The axial flow fan or compressor rotating stall recovery process and apparatus of this invention involves the injection of high temperature or low density gases into the fan or compressor inlet while it is operating in rotating stall. Preferably, this injection will occur immediately after rotating stall is detected. The ingestion of high temperature or low density gases into the axial flow fan or compressor induces a transient response from the compression system that allows the fan or compressor to recover from the rotating stall operating condition.

Figure 1:
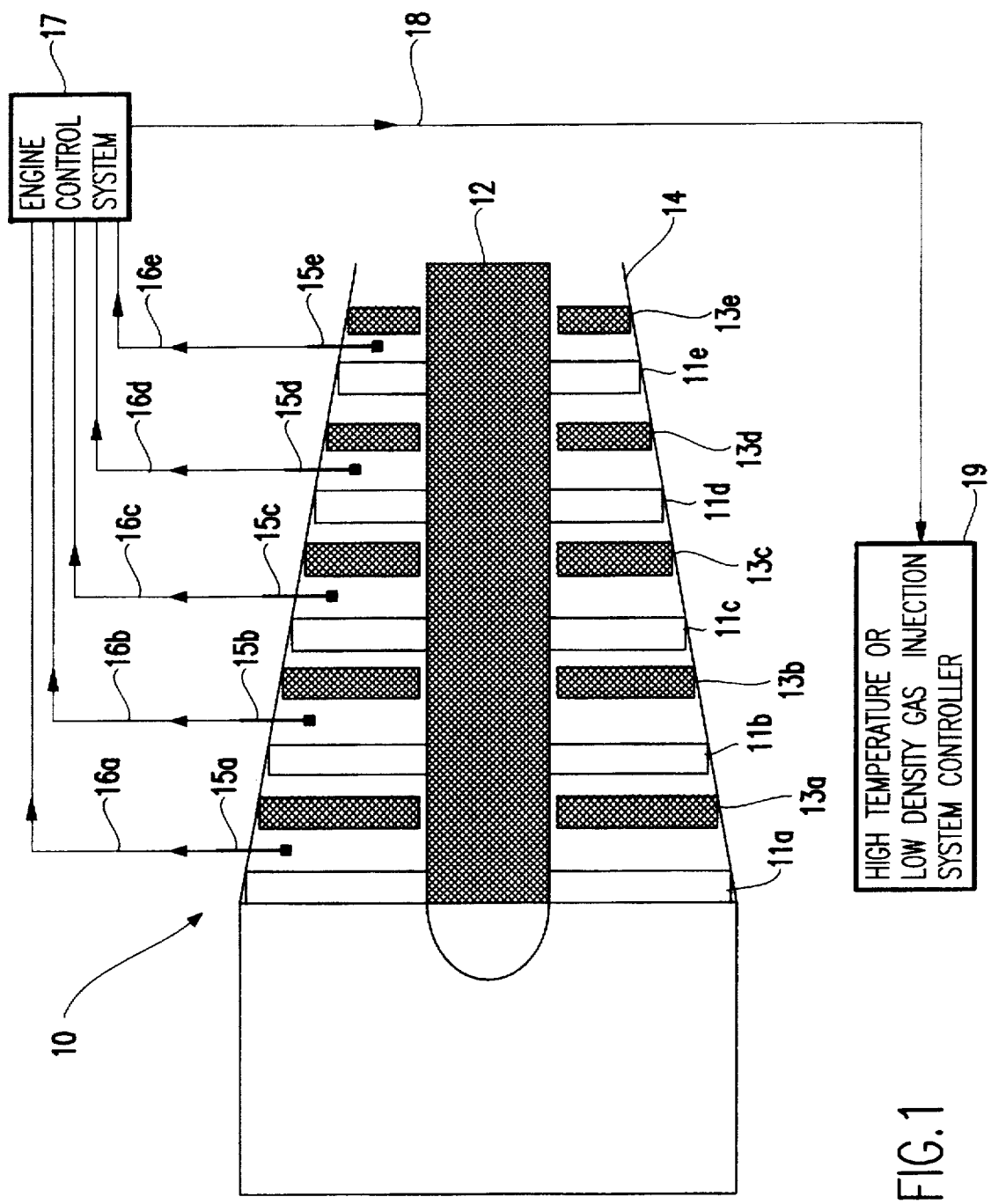
FIG. 1 is a block schematic diagram of a multi-stage axial flow fan or compressor identifying the rotating stall sensors and location, the engine control system, and the high temperature or low density gas injection system controller for the rotating stall recovery system of this invention.

Referring to FIG. 1, a schematic of a multi-stage axial flow fan or compressor 10 includes several rows of rotating fan or compressor blades called rotors 11 a–e which are connected to a common drive shaft 12. Nested in between each of the rotating rotors 11a–e are sets of stationary blades called stators 13a–e which are attached to the fan or compressor outer casing 14. Sensors 15a–e for detecting rotating stall are preferably positioned directly behind each of the fan or compressor rotors 11 a–e; however, they may also be positioned behind each of the stators 13a–e in front of or behind the compressor rotor, behind inlet guide vanes or at other locations inside and outside the casing 14. These sensors 15a–e may be electronic pressure transducers, sound pressure microphones, hot film/wires, or other suitable devices. While FIG. 1 shows a separate sensor 15a–e for each rotor 11a–e, greater or fewer numbers of sensors can be used within the practice of this invention. 7 When a rotating stall develops in any of the rotors 11a–e of the fan or compressor, a signal 16a–e is sent to the engine control system 17 from the sensor 15a–e which detects the rotating stall. Signals 16a–e are preferably transmitted electronically by hardwire connections; however, wireless transmissions and other signaling modes may also be employed.

Various engine operating parameters are fed as electronic signals to the engine control system 17 which, in response, outputs electronic control signals to regulate engine subsystems such as engine fuel flow and variable geometry parts including nozzle exit area, bleed valves, and variable inlet guide vanes and stator blades. The purpose of controlling these engine subsystems is to govern engine speed, control acceleration and deceleration rates, and compensate for altitude variations. This invention contemplates an additional engine subsystem that is controlled by the engine control system 17. Specifically, it is envisioned that a rotating stall recovery subsystem will be provided that detects rotating stall in the fan or compressor and then initiates a recovery from the rotating stall operating condition. This subsystem could be implemented in multi-stage axial flow fans or compressors 10 as shown in FIG. 1, or in single-stage flow fans and compressor.

FIG. 1 shows a control signal 18 being sent from the engine control system 17 to a controller 19 for injecting high temperature or low density gas into the compressor inlet. In the practice of this invention, when a rotating stall detection signal 16a–e is sent by any of the rotating stall sensors 15a–e to the engine control system 17, the engine control system 17 sends control signal 18 to the controller 19 to inject high temperature or low density gases into the axial flow fan or compressor 10 inlet. It has been found that altering the temperature or density of the working gas entering the axial flow fan or compressor 10 after rotating stall arises can allow the axial flow fan or compressor 10 to recover from rotating stall. Preferably, the high temperature or low density gases are injected immediately after the stall is detected and continued until recovery from stall occurs. The optimun injection method may be continuous or time-varying, according to the particular situation and the compressor characteristic.

For purposes of this invention "high temperature gas" implies that the temperature of the injected gas used to induce rotating stall recovery is higher than the temperature of the working gas entering the fan or compressor inlet. The temperature range of the injected gas preferably is at least 50° C. or greater relative to the temperature of the working gas. For example, if the temperature of the working gas entering a fan or compressor inlet is 10° C., then the temperature of the injected gas used to induce rotating stall recovery should be at least 60° C. In addition, for purposes of this invention "low density gas" implies that the density of the injected gas used to induce rotating stall recovery is lower than the density of the working gas entering the fan or compressor inlet. For example, if the density of the working gas entering a fan or compressor inlet is at 0.076 lbm/ft$^3$, then the density of the injected gas used to induce rotating stall recovery should be less than 0.076 lbm/ft$^3$.

Figure 2:
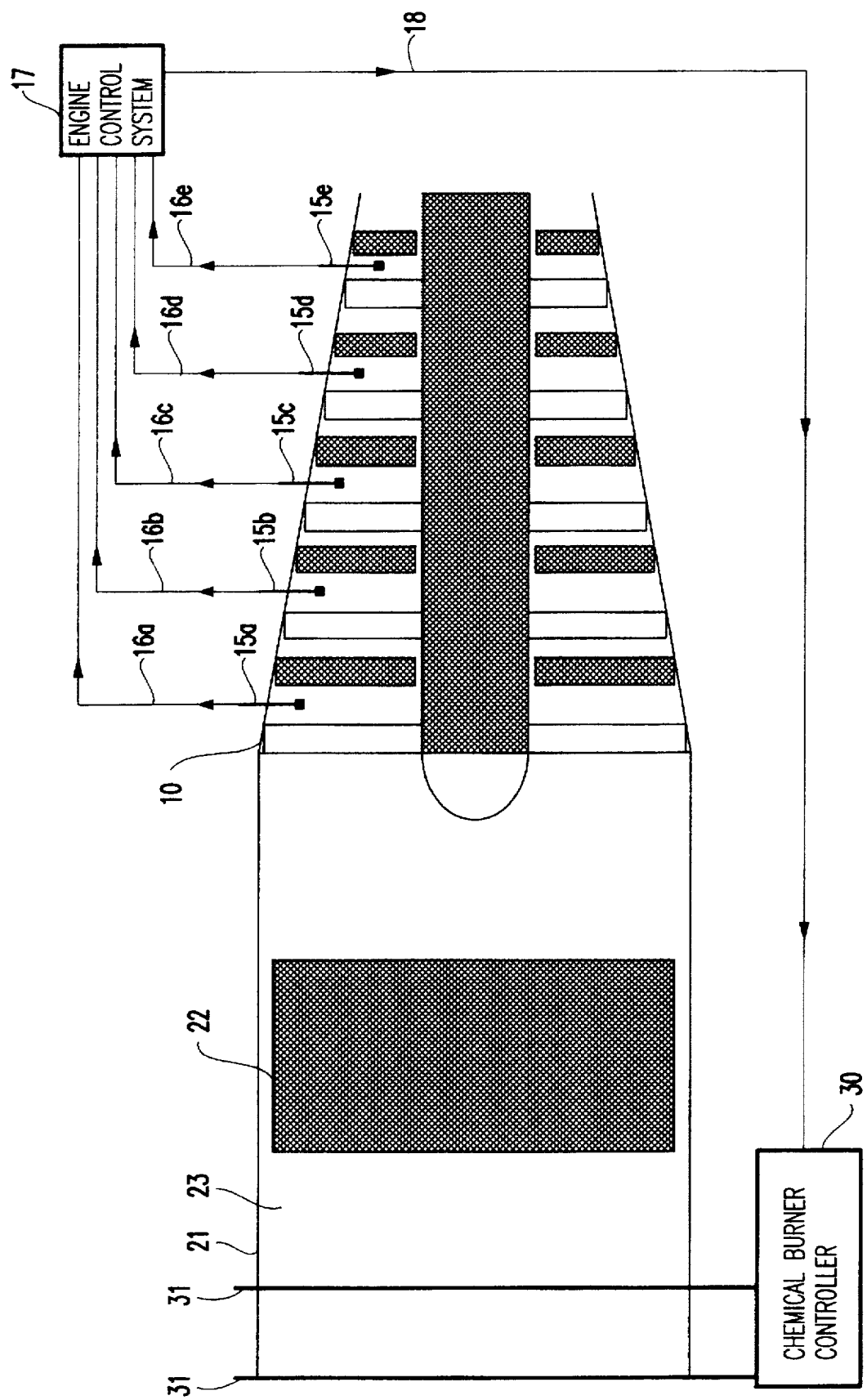
FIG. 2 is a block schematic diagram showing a chemical burner or burners for combusting a fuel and oxidizer positioned in front of or within the fan or compressor inlet.

FIG. 2 shows one example of an implementation of the inventive method and apparatus on an aircraft gas turbine engine. In FIG. 2, a chemical burner control 30 performs the function of a high temperature injection system controller and operates one or more chemical burners 31 for combusting fuel and oxidizer to produce a hot pocket of burning gas 22 which will be introduced into the axial flow fan or compressor. Many different fuels may be used in conjunction with this invention, and typical examples include propane, methane, hydrogen, alcohol, gasoline, kerosene, nitromethanol and jet fuel. In addition, many different oxidizers may be employed for combustion of fuels and typical examples include air and pure oxygen. The hot pocket of burning gas 22 is less dense than the working gas 23 which is normally fed to the fan or compressor 10. In this embodiment, the burners 31 are positioned directly in front of the axial flow fan or compressor inlet duct 21. In response to a rotating stall signal 16a–e from sensors 15a–e, the engine control system 17 signals 18 the chemical burner control 30, which, in turn, ignites the burners 31. The hot gas 22 which is injected into the axial flow fan or compressor 10 causes the axial flow fan or compressor 10 to recover from rotating stall. Once recovery is complete, as sensed by sensors 15a–e, the engine control system 17 signals 18 the chemical burner control 30 to shut off the burners 31.

Figure 3:
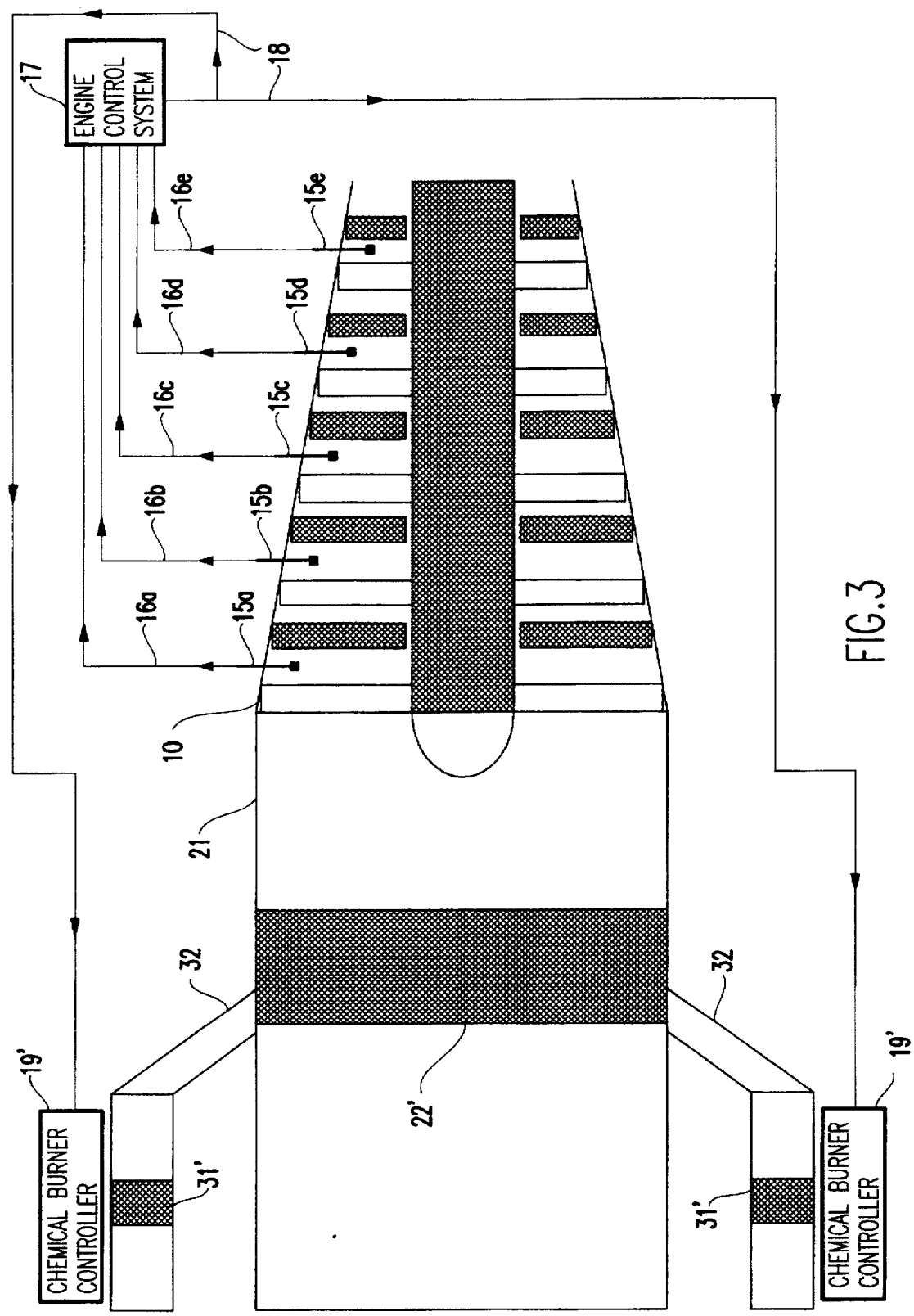
FIG. 3 is an alternative block schematic diagram to that shown in FIG. 2, and depicts a chemical burner or burners positioned outside the fan or compressor inlet duct.

FIG. 3 shows a variation on the arrangement shown in FIG. 2 wherein the chemical burners 31' are located outside of the inlet duct 21 of the axial flow fan or compressor 10. In addition, FIG. 3 shows the use of a plurality of chemical burner controls 19', one for each burner 31', which receive signals 18 from the engine control system 17 in response to the detection of rotating stall and recovery from rotating stall by sensors 15a–e. Combustion gases from the burners 31' are channeled by ducting or tubing 32 into the fan or compressor inlet duct 21 to produce a hot pocket of gases 22' which is injected into the axial flow fan or compressor 10. As with FIG. 2, control of stall recovery is "active" in the sense that ignition of the burners 19' is performed in response to a rotating stall signal 16a–e from any of the stages of the fan or compressor.

Figure 4:
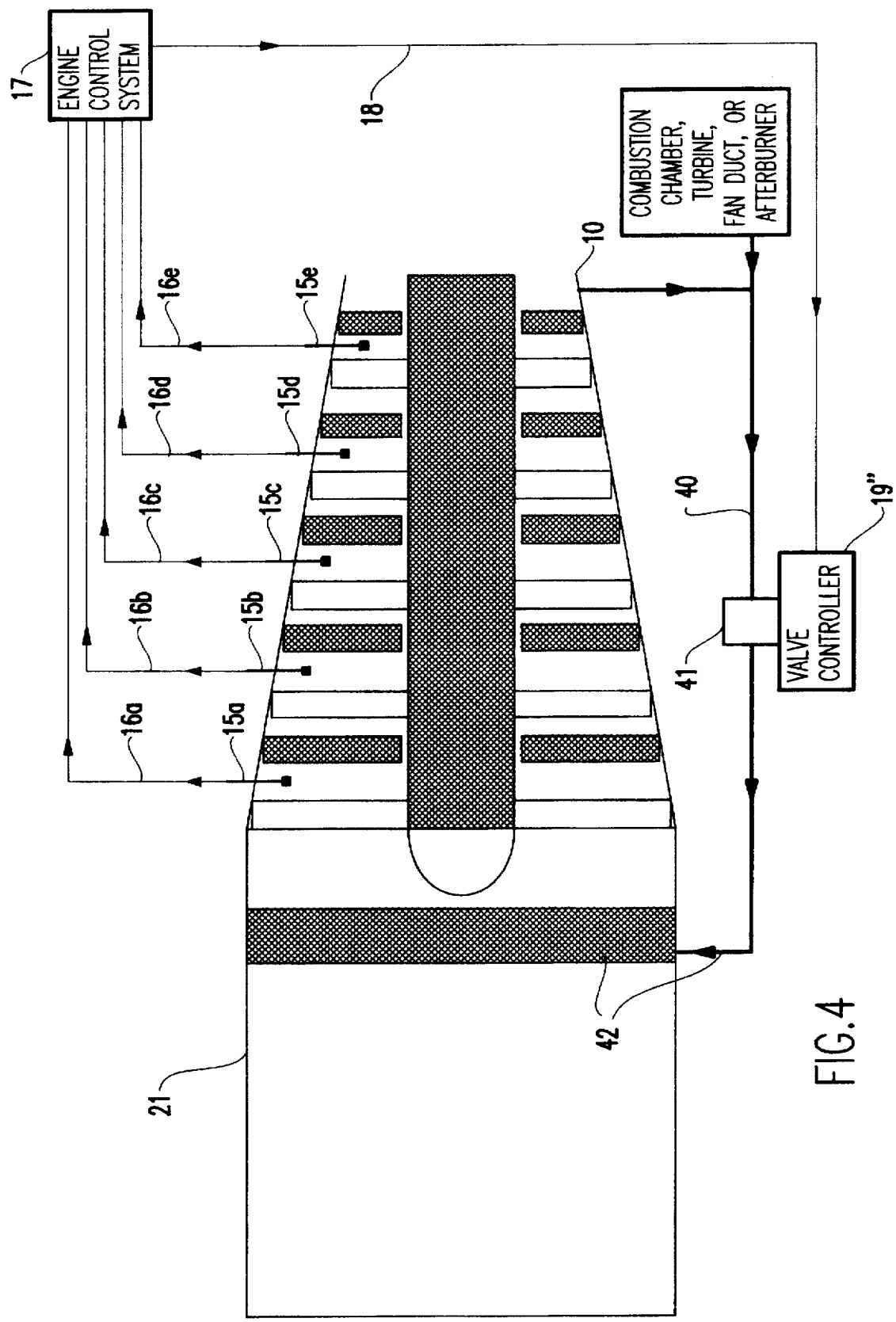
FIG. 4 is a block schematic diagram showing a bleed mechanism for bleeding high temperature air off the rear stages of a fan or compressor and injecting this air directly back into the fan or compressor inlet.

FIG. 4 illustrates another embodiment of the invention which involves bleeding the high temperature air off of the rear stages of the fan or compressor and injecting it into the fan or compressor inlet. Tubing or ducting 40 can be installed on the rear stage or stages of the fan or compressor 10 to channel the high temperature air back into the fan or compressor inlet duct 21. While FIG. 4 shows only one port for entry of hot gases into the inlet duct and one bleed line from the rear stage of the fan or compressor 10, it should be understood that several ports could be provided circumferentially around the inlet duct 21, and that bleed lines can be made from several areas of the fan or compressor 10, or from other sources of hot gases associated with the engine or the apparatus to which it is connected. A particular advantage of the design in FIG. 4 is that eliminates the need for burners and a separate fuel line. In FIG. 4, an electronic or pneumatic valve or valves 41 are installed in the tubing or ducting 40. When a rotating stall detection signal 16a–e is produced by the rotating stall sensors 15a–e and is sent to the engine control system 17, a rotating stall recovery signal 18 is sent from the engine control system 17 to the valve controller 19" which, in turn, operates the valve 41. Opening the valve 41 causes the high temperature, high pressure air 42 to flow from the rear stages of the fan or compressor 10 into the inlet duct 21 to induce the fan or compressor 10 recovery from rotating stall.

The compressed air flowing through the rear stages of a high speed multi-stage fan or compressor is very high in temperature due to the compression process and the mechanical work accomplished on the air. Therefore, the rear stage or stages of the fan or compressor are the logical location to bleed off high temperature air for the rotating stall recovery process. In addition to injecting high temperature air into the fan or compressor inlet 21, this methodology and design has the effect of opening valves on the fan or compressor 10 to relieve air pressure from the fan or compressor. This effect increases fan or compressor stability and assists in the rotating stall recovery process.

A similar approach involves bleeding off high temperature air from other sections of the gas turbine engine instead of the fan or compressor. These sections include the combustion chamber, turbine, fan duct and afterburner sections. Tubing, ducting and valves would connect the fan or compressor inlet 21 to these other sections of the gas turbine engine in the same manner as described for the fan or compressor 10. The rotating stall detection and rotating stall recovery control signals would be produce in the same way as described above.

Figure 5:
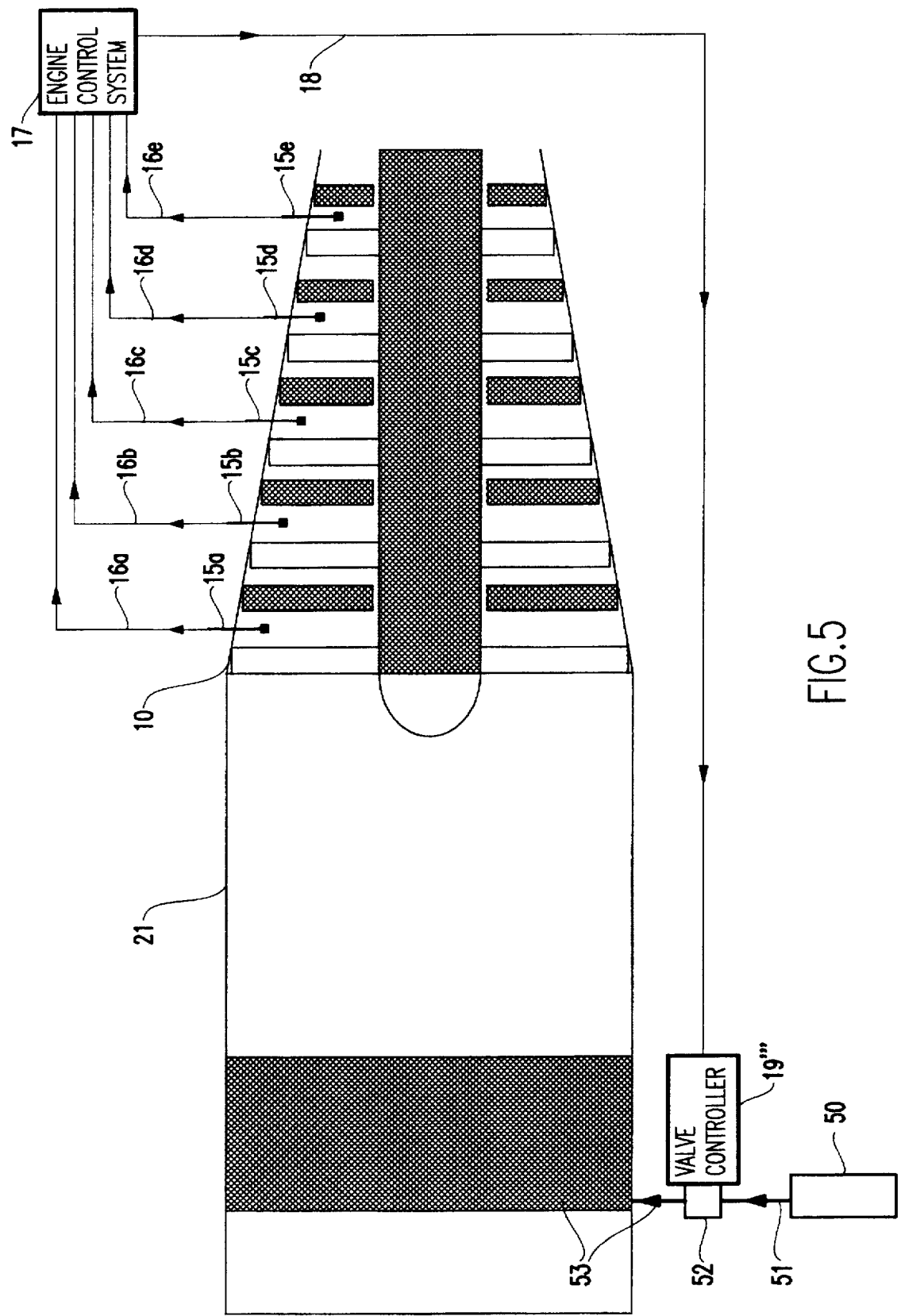
FIG. 5 is a block schematic diagram showing a low density gas, such as helium, being selectively ducted or channeled into the fan or compressor inlet.

FIG. 5 shows another embodiment of the invention wherein a source of low density gas 50, such as helium, is ducted or channeled into the fan or compressor inlet 21 by ducting or tubing 51. The source of the low density gas 50 can be an ordinary container or cylinder for storing bottled gases. An electronic or pneumatic valve or valves 52 is installed in the tubing or ducting 51. When engine control system 17 sends control signals 18 to valve controller 19'" in response to rotating stall signals 16a–e provided by sensors 15a–e, the valve controller 19'" causes the valve 52 to open thereby introducing low density gas 53 into the inlet 21 of the axial flow fan or compressor 10 to induce recovery from rotating stall.

In all embodiments of this invention, an active control is used to introduce gas that is of a lower density than the working gas which is ordinarily ingested into the compressor or fan. No modification to the compressor or fan inlet is made other than the ability to introduce the low density gas. Thus, the low density gas enters the compressor or fan in the same way and in combination with the working gases. This invention takes advantage of the discovery that introduction of low density gas into a compressor or fan which has one or more stages operating in rotating stall, causes the compressor or fan to recover from rotating stall. A preferred method of introducing low density gas into the compressor of axial flow fan is to introduce heated gases, e.g., combustion gases from a burner or from the engine itself, into the inlet, since these gases are lower density than the working gas.

While the invention has been described in terms of its preferred embodiments, those skilled in the art will recognize that the invention can be practiced with modification within the spirit and scope of the appended claims.

We claim:

1. A compressor or axial flow fan, comprising:
   an inlet for admitting a working gas into said compressor or axial flow fan;
   means for sensing rotating stall in said compressor or axial flow fan; and
   means for injecting low density gas which is of a density that is lower than said working gas into said compressor or axial flow fan in response to the rotating stall sensed by said means for sensing rotating stall.

2. The compressor or axial flow fan of claim 1 wherein said means for injecting low density gas includes a burner for producing high temperature gas of low density, said burner being positioned to introduce said high temperature gas into said inlet of said axial flow fan or compressor.

3. The compressor or axial flow fan of claim 2 wherein said burner is positioned within said inlet.

4. The compressor or axial flow fan or claim 2 wherein said burner is positioned outside of said inlet, and further comprising a means for channeling high temperature gases from said burner to said inlet.

5. The compressor or axial flow fan of claim 1 wherein said means for injecting low density gas includes a compressed gas source.

6. The compressor or axial flow fan of claim 5 wherein said compressed gas source is helium.

7. The compressor or axial flow fan of claim 1 wherein said means for injecting low density gas includes a source of high temperature gas and a port for introducing said high temperature gas into said inlet of said axial flow fan or compressor.

8. The compressor or axial flow fan of claim 7 wherein said source of high temperature gas is a bleed line from said axial flow fan or compressor.

9. The compressor or axial flow fan of claim 7 wherein said source of high temperature gas is a bleed line from a device other than said axial flow fan or compressor.

10. The compressor or axial flow fan or claim 9 wherein said device is selected from the group consisting of a combustion chamber, a turbine, a fan duct, and an afterburner.

11. A method for recovering from rotating stall in a compressor or axial flow fan, comprising the steps of:
    sensing the rotating stall;
    injecting low density gas into an inlet for said compressor or axial flow fan after said rotating stall condition is sensed, said low density gas being of a density that is lower than a working gas introduced into said inlet during operation of said compressor or axial flow fan; and
    stabilizing said compressor or axial flow fan.

12. The method of claim 11 further comprising the step of stopping said injecting step after completing said stabilizing step.

13. The method of claim 11 wherein said injecting step includes the step of combusting gases to produce said low density gas.

14. The method of claim 11 wherein said step of injecting includes the steps of storing a compressed low density gas, and selectively releasing an amount of said compressed low density gas.

15. The method of claim 11 wherein said step of injecting includes the step of bleeding a high temperature gas from a source.

* * * * *